(12) United States Patent
Shirai (10) Patent No.: US 11,194,314 B2
(45) Date of Patent: Dec. 7, 2021

(54) NUMERICAL CONTROL DEVICE

(71) Applicant: FANUC CORPORATION, Yamanashi (JP)

(72) Inventor: Kenichiro Shirai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/891,247

(22) Filed: Jun. 3, 2020

(65) Prior Publication Data
US 2020/0387140 A1    Dec. 10, 2020

(30) Foreign Application Priority Data

Jun. 5, 2019 (JP) .............................. JP2019-105398

(51) Int. Cl.
*G05B 19/4155*    (2006.01)
*G05B 19/4068*    (2006.01)

(52) U.S. Cl.
CPC ..... *G05B 19/4155* (2013.01); *G05B 19/4068* (2013.01)

(58) Field of Classification Search
None
See application file for complete search history.

(56) References Cited

U.S. PATENT DOCUMENTS

| | | | | |
|---|---|---|---|---|
| 5,793,635 | A | * | 8/1998 | Niwa ................... G05B 19/406 318/570 |
| 2002/0138171 | A1 | | 9/2002 | Fukutani |
| 2011/0015771 | A1 | | 1/2011 | Guo et al. |
| 2015/0105879 | A1 | | 4/2015 | Hatanaka |
| 2016/0062337 | A1 | | 3/2016 | Taira et al. |
| 2016/0109877 | A1 | * | 4/2016 | Ishiwari ............. G05B 19/4155 700/173 |
| 2017/0003673 | A1 | | 1/2017 | Souma |
| 2019/0121327 | A1 | | 4/2019 | Sakayori et al. |

FOREIGN PATENT DOCUMENTS

JP    2015-079344    4/2015

OTHER PUBLICATIONS

Extended European Search Report dated Oct. 27, 2020 in European Patent Application No. 20177550.9.

* cited by examiner

*Primary Examiner* — Ryan A Jarrett
(74) *Attorney, Agent, or Firm* — Wenderoth, Lind & Ponack, L.L.P.

(57) ABSTRACT

A numerical control device stops automatic operation after machining of a specific part without the need to manually modify a machining program or to perform macro computation. The numerical control device includes a program analysis section that, upon executing a command program for continuously machining a plurality of parts, analyzes the command program, an analyzed program execution unit that executes the command program analyzed, a program stop condition setting section that sets a program stop condition in the command program based on a machining stop condition specified by a user, a program stop determining section that determines whether an execution block of the command program satisfies the program stop condition based on an analysis result, and a program stop requesting section that, when it is determined that the execution block satisfies the program stop condition, outputs an execution block stop request to the analyzed program execution unit.

5 Claims, 6 Drawing Sheets

←BLOCK UNDER EXECUTION

←SPECIFY SEQUENCE NUMBER THAT IS DESIRED TO STOP FROM AMONG UNMACHINED PORTIONS OF MACHINING PROGRAM BEFORE MACHINING OR UNDER MACHINING

AUTOMATIC OPERATION IS STOPPED AT THE TIME N11G00X40. Y40. IS EXECUTED, AND THE SETTING OF SEQUENCE NUMBER IS −1 (FUNCTION DISABLED)

NUMERICAL CONTROL DEVICE

This application is based on and claims the benefit of priority from Japanese Patent Application No. 2019-105398, filed on 5 Jun. 2019, the content of which is incorporated herein by reference.

BACKGROUND OF THE INVENTION

Field of the Invention

The present invention relates to a numerical control device.

Related Art

A numerical control device for controlling a machine tool has a function to stop the execution of a program in the middle of the running of the program in order to perform validation of the program.

For example, Japanese Unexamined Patent Application, Publication No. 2015-79344 discloses a function of smoothly performing validation by pausing the execution of the program immediately after sub program call or macro call.

Here, the sub program is a program in which operations such as a fixed operation and a repetitive operation are registered. It becomes possible to easily describe the program by using the sub program call in a main program. Furthermore, the macro call is a function that enables the sub program to specify arguments to realize more versatile call.

Figure 5:
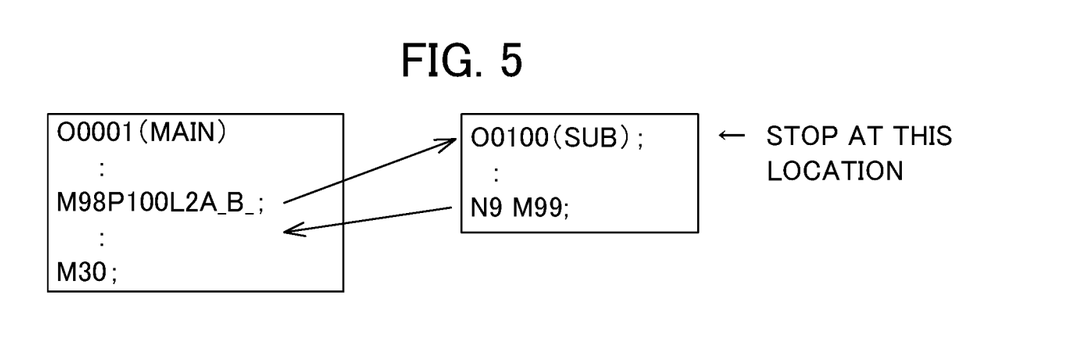
FIG. 5 is a diagram showing an example of a sub program call function.

FIG. 5 shows an example of the sub program call function. The "M98P100L2A_B_" block calls the subprogram "0100(SUB)" in the main program "00001(MAIN)".

Figure 6:
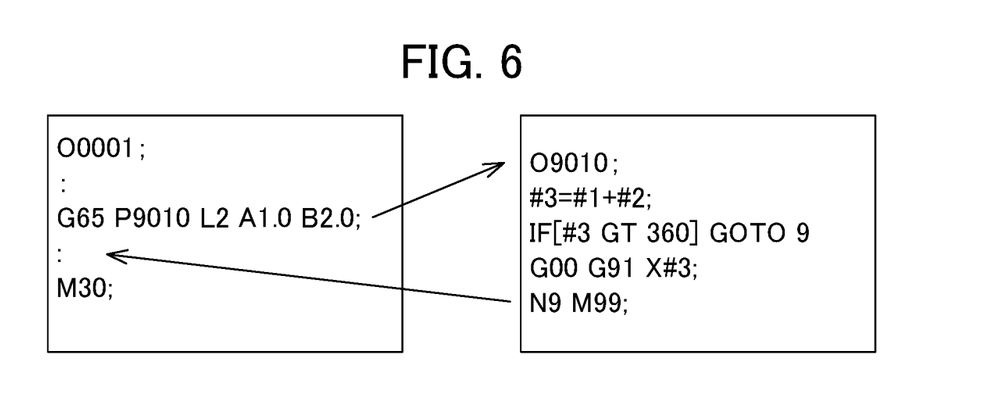
FIG. 6 is a diagram showing an example of a macro call function.

FIG. 6 shows an example of the macro call function. In FIG. 6, A1. 0 and B2. 0 of the G65 block are handed over to 09010 as arguments, and become variables of the macro variable #1 and the macro variable #2. The macro call by G65 is referred to as a simple call, and performing the same macro call as G65 by a G code which is registered in advance (not shown) is referred to as macro call by G code.

Furthermore, as another program stop function, there is a sequence number comparison function. The sequence number comparison function is a function to stop automatic operation when the block matching the program number and sequence number set in advance is executed.

Figure 7:
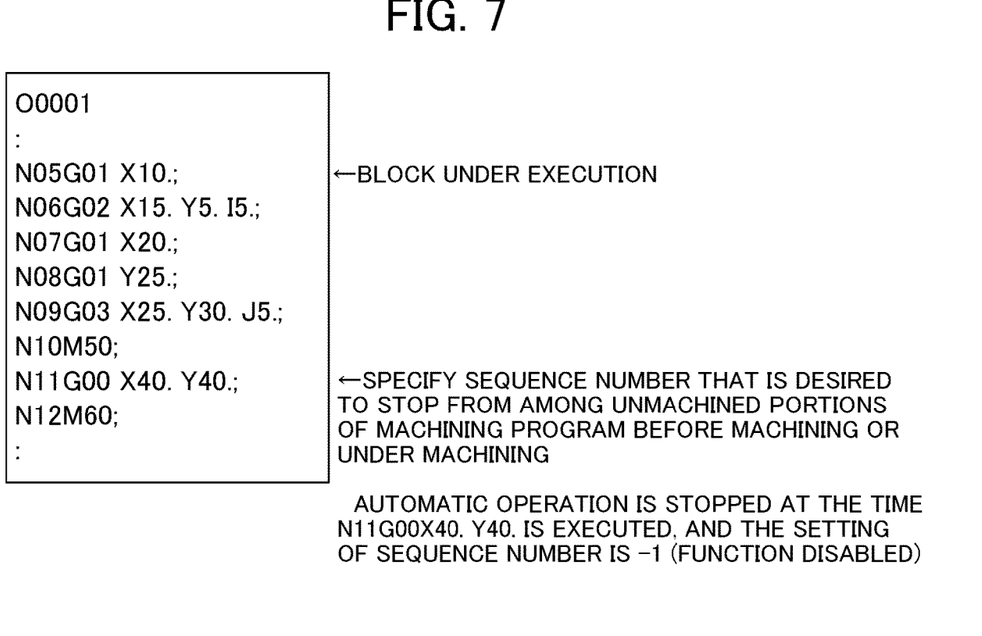
FIG. 7 is a diagram showing an example of a sequence number comparison function.

FIG. 7 shows an example of a sequence number comparison stop function. In FIG. 7, in a case in which "1" is specified as the program number that is desired to be stop from among the unmachined portions of the machining program before or during machining, and "11" is specified as the sequence number that is desired to be stopped, the automatic operation is stopped at the time the block of "N11G00X40. Y40." is executed, and the setting of the sequence number is -1 (function disabled).

Patent Document 1: Japanese Unexamined Patent Application, Publication No. 2015-79344

SUMMARY OF THE INVENTION

However, the program stop function disclosed in Japanese Unexamined Patent Application, Publication No. 2015-79344 can only handle the first time of the sub program call. Therefore, in a case of a machining program that calls sub programs multiple times from the main program in order to specify the part machining shapes by the sub programs and continuously machine the plurality of the parts, in order to stop at the block of a specified N number after machining of the X-th part (X is a natural number of 2 or more), it is necessary to set the abovementioned sequence number comparison stop function after the execution of the block of the specified N number of the (X-1)-th part, or to count the number of times of the sub program call manually, and thus, it is necessary to manually set complicated processing.

In view of the above, it is an object of the present invention to provide a numerical control device that can stop automatic operation after machining of a specific part without the need to manually modify a machining program or to perform macro computation.

According to an aspect of the present disclosure, a numerical control device that operates in accordance with a command program, includes: a program analysis section that, upon executing a command program for continuously machining a plurality of parts, analyzes the command program; an analyzed program execution unit that executes the command program analyzed by the program analysis section; a program stop condition setting section that sets a program stop condition in the command program on a basis of a machining stop condition for stopping the continuous machining specified by a user; a program stop determining section that determines whether an execution block of the command program satisfies the program stop condition on a basis of an analysis result of the command program by the program analysis section; and a program stop requesting section that, in a case in which the program stop determining section determines that the execution block of the command program satisfies the program stop condition, outputs an execution block stop request of the command program to the analyzed program execution unit.

According to one aspect, it is possible to stop automatic operation after machining of a specific part without the need to manually modify a machining program or to perform macro calculation.

DETAILED DESCRIPTION OF THE INVENTION

1. First Embodiment

Figure 1:
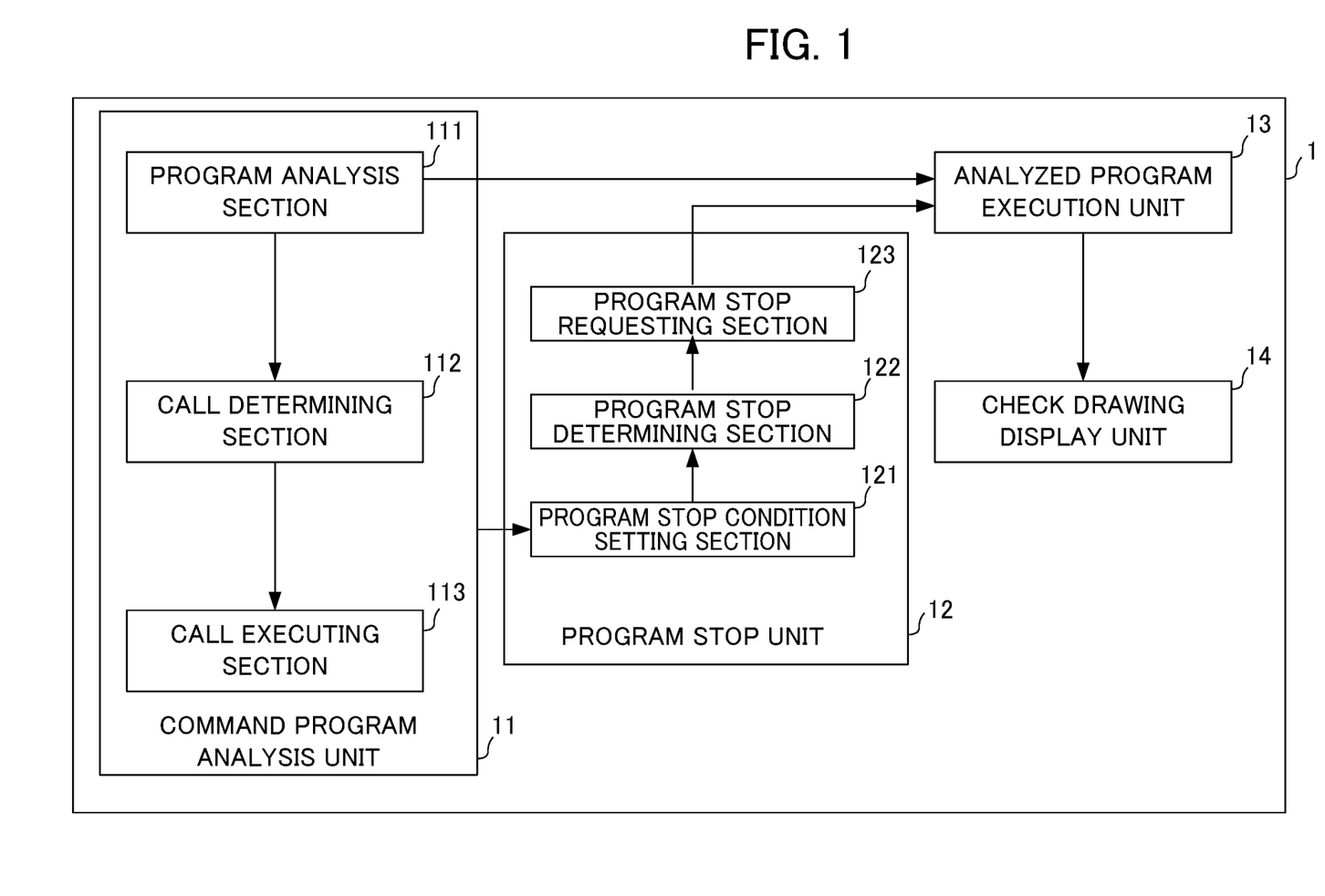
FIG. 1 is a diagram showing the configuration of a numerical control device of an embodiment.
Figure 2:
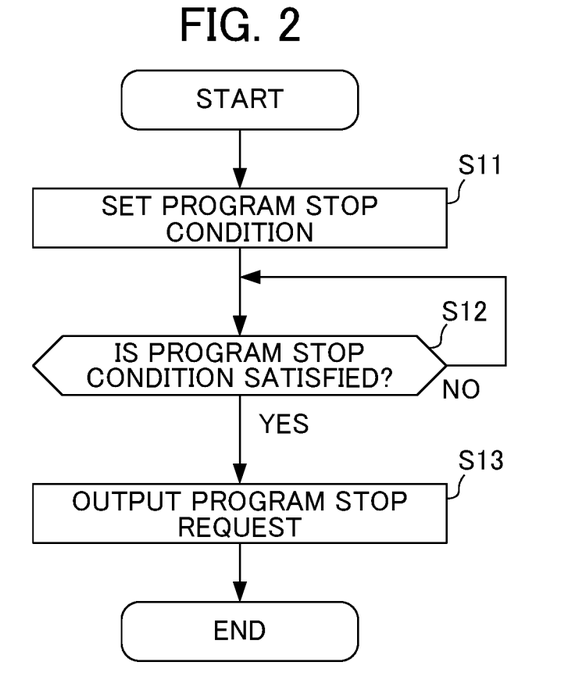
FIG. 2 is a flowchart showing the operation of the numerical control device of an embodiment.

Hereinafter, a first embodiment of the present invention will be described with reference to FIGS. 1 and 2. FIG. 1 shows the overall configuration of a numerical control device according to the first embodiment. FIG. 2 is a flowchart showing the operation of the numerical control device 1. The numerical control device 1 according to the first embodiment is a device that sets a program stop condition corresponding to the machining stop condition to finish machining at a position where machining is completed at the part immediately before the remaining amount of consumables such as wires runs out.

1.1 Overall Configuration

As shown in FIG. 1, the numerical control device 1 includes a command program analysis unit 11, a program stop unit 12, an analyzed program execution unit 13, and a check drawing display unit 14.

The command program analysis unit 11 includes a program analysis section 111, a call determining section 112, and a call executing section 113. The program analysis section 111 analyzes the command program at the time of executing the command program. In the first embodiment, the program analysis section 111 analyzes the command program for continuously machining a plurality of parts. The call determining section 112 determines macro call or sub program call on the basis of the analysis result of the command program by the program analysis section 111. The call executing section 113 executes a macro call or a subprogram call determined to be invoked by the call determining section 112.

The program stop unit 12 includes a program stop condition setting section 121, a program stop determining section 122, and a program stop requesting section 123.

With respect to a machining stop condition set by a user, more specifically, a machining stop condition to finish machining at a position where machining is completed at the part immediately before the remaining amount of consumables used for continuous machining such as a wire runs out, the program stop condition setting section 121 sets a program stop condition including the number of blocks from the head of the program of the command program corresponding to the machining stop condition to the stop block.

For example, in the first step, the program stop condition setting section 121 acquires the remaining distance X km of the wire recorded in the memory (not shown) of the numerical control device 1. In the second step, the program stop condition setting section 121 acquires the distance Y km of the wire required to machine one part recorded in the memory of the numerical control device 1. In the third step, the program stop condition setting section 121 calculates the number Z pieces that can be machined by the remaining wire on the basis of the remaining distance X km of the wire and the distance Y km of the wire required for machining. In the fourth step, the program stop condition setting section 121 calculates, as the program stop condition, the number of blocks from the head of the program when machining of the remaining Z pieces is finished to the stop block (for example, a block such as G40, which is a code for ending the diameter compensation, or a wire cutting instruction M60), and sets a program stop condition including the number of the blocks.

The program stop determining section 122 determines whether or not the execution block of the command program satisfies the program stop condition on the basis of the analysis result of the command program by the program analysis section 111. If it is determined as YES, the program stop is requested to the program stop requesting section 123.

In a case in which the program stop is requested from the program stop determining section 122, the program stop requesting section 123 outputs an execution block stop request of the command program to the analyzed program execution unit 13.

The analyzed program execution unit 13 executes the command program analyzed by the program analysis section 111. In particular, in the present embodiment, upon acquiring the execution block stop request from the program stop requesting section 123, the analyzed program execution unit 13 stops the execution of the command program in the block that has been requested.

The check drawing display unit 14 acquires information for drawing the machining path commanded by the command program from the analyzed program execution unit 13, and displays the machining path on a display device (not shown). It should be noted that the display device may include a touch screen which allows the user to select the machining shape of each of the parts by touching the screen of the display device.

It should be noted that, in addition to the above, the numerical control device 1 includes general functional blocks such as a functional block for controlling a machine tool, a functional block for performing communication, and a functional block for accepting operations from a user. However, these general functional blocks are well known to those skilled in the art, and thus are not shown or explained.

1.2 Operation

FIG. 2 is a flowchart showing the operation of the numerical control device 1. In Step S11, the program stop condition setting section 121 sets the program stop condition. In particular, in the present embodiment, as described above, the program stop condition setting section 121 calculates the number Z pieces that can be machined by the remaining wire on the basis of the remaining distance X km of the wire and the distance Y km of the wire required to machine one part, followed by calculating, as the program stop condition, the number of the blocks from the head of the program when machining of the remaining Z pieces is completed to the stop block (for example, a block such as G40, which is a code for ending the diameter compensation, or a wire cutting instruction M60).

In Step S12, the program stop determining section 122 determines whether or not the execution block of the command program satisfies the program stop condition. If it is determined as YES (S12: YES), the processing advances to Step S13. If it is determined as NO (NO: S12), the processing returns to Step S12.

In Step S13, the program stop determining section 122 requests the program stop to the program stop requesting section 123, and the program stop requesting section 123 outputs an execution block stop request of the command program to the analyzed program execution unit 13.

1.3 Effect of First Embodiment

As described above, the numerical control device 1 according to the first embodiment includes: a program stop condition setting section 121 that sets a program stop condition in the command program on a basis of a machining stop condition for stopping the continuous machining specified by a user; a program stop determining section 122 that determines whether an execution block of the command program satisfies the program stop condition on a basis of an analysis result of the command program; and a program stop requesting section 123 that, in a case in which it is determined that the execution block of the command program satisfies the program stop condition, outputs an execution block stop request of the command program to the analyzed program execution unit.

With such a configuration, it is possible to stop the automatic operation after machining of a specific part without the need to modify the machining program manually or to perform macro calculation.

Furthermore, in a case in which the machining stop condition is a condition to finish machining at a position where machining is completed at a part immediately before a remaining amount of a consumable used for the continuous machining runs out, the program stop condition setting section 121 sets a program stop condition including a number of blocks from a program head of the command program corresponding to the machining stop condition to a stop block.

With such a configuration, it is possible to prevent the consumables such as wires from running out during machining a part, and it is also possible to use the consumables without waste.

2. Second Embodiment

Figure 3:
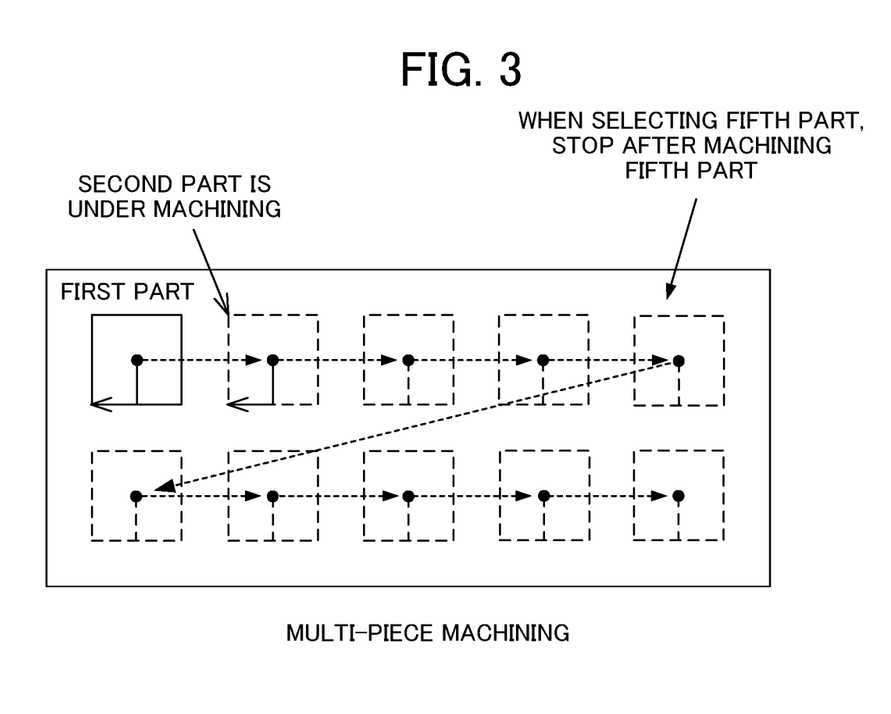
FIG. 3 is a diagram showing an example of a display screen at the time of multi-piece machining in the numerical control device of an embodiment.

Hereinafter, a second embodiment of the present invention will be described with reference to FIG. 3. FIG. 3 shows an example of a display screen at the time of multi-piece machining provided in the numerical control device 1 according to the second embodiment.

A numerical control device 1A according to the second embodiment specifies a specific position among the machining shapes of the unmachined portion of the check drawing path by a user through a touch screen or the like of the display screen provided in the numerical control device 1A, and sets a program stop condition corresponding to the machining stop condition that stops machining at this specified position.

In the example of the machining path drawing screen of the multi-piece machining shown in FIG. 3, the machined machining path is shown as a solid line and the unmachined machining path is shown as a dotted line. However, the present invention is not limited thereto, and the machined machining path may be shown as a dotted line and the unmachined machining path as a solid line. The black circles are shown as machining start points, and it is also possible to stop machining after machining. The user selects a machining position at which it is desired to stop machining from among a plurality of machining shapes.

It should be noted that FIG. 3 shows an example of the machining path drawing screen for performing multi-piece machining on the square parts having two rows vertically and five columns horizontally. The machining path of the second part under machining is indicated by a solid line, and the machining path of the subsequent part is indicated by a dotted line. Furthermore, in a case in which the machining shape of the fifth part is selected, the setting to stop after machining the fifth part is performed.

Furthermore, although the numerical control device 1A according to the second embodiment and the numerical control device 1 according to the first embodiment differ from each other in the machining stop condition and the program stop condition, the configurations therebetween are the same. Therefore, illustration and explanation thereof are omitted.

2.1 Machining Stop Condition

In the present embodiment, with respect to a machining stop condition set by a user, more specifically, a machining stop condition to stop machining at a specified position of the machining shape of the unmachined portion of the check drawing path, the program stop condition setting section 121 sets a program stop condition including the number of blocks from a program head of the command program corresponding to the machining stop condition to the stop block when machining of a predetermined machining shape is finished.

For example, in the first step, the program stop condition setting section 121 calculates the machining shape of what number the shape is when the user specifies the machining shape of the unmachined portion of the check drawing path by a touch screen. As a result, it is calculated as the X-th machining shape. In the second step, the program stop condition setting section 121 calculates, as the program stop condition, the number of blocks from the program head when machining of the machining shape of the remaining X-th piece is finished to the stop block (for example, a block such as G40, which is for ending the diameter compensation, or a wire cutting instruction M60).

2.2 Effect of Second Embodiment

As described above, in a case in which the machining stop condition is the condition for stopping machining at a specified position of the machining shape of the unmachined portion of the check drawing path, the program stop condition setting section 121 sets a program stop condition including the number of blocks from the program head of the program corresponding to the machining stop condition to the stop block when machining of a predetermined machining shape is finished.

With such a configuration, it is unnecessary to repeat restarting and stopping the automatic operation many times in order to stop machining at a desired location, and furthermore, it is also unnecessary for the operator to check the machining status may times until machining at the location that is desired to be stopped is finished.

3. Third Embodiment

Figure 4:
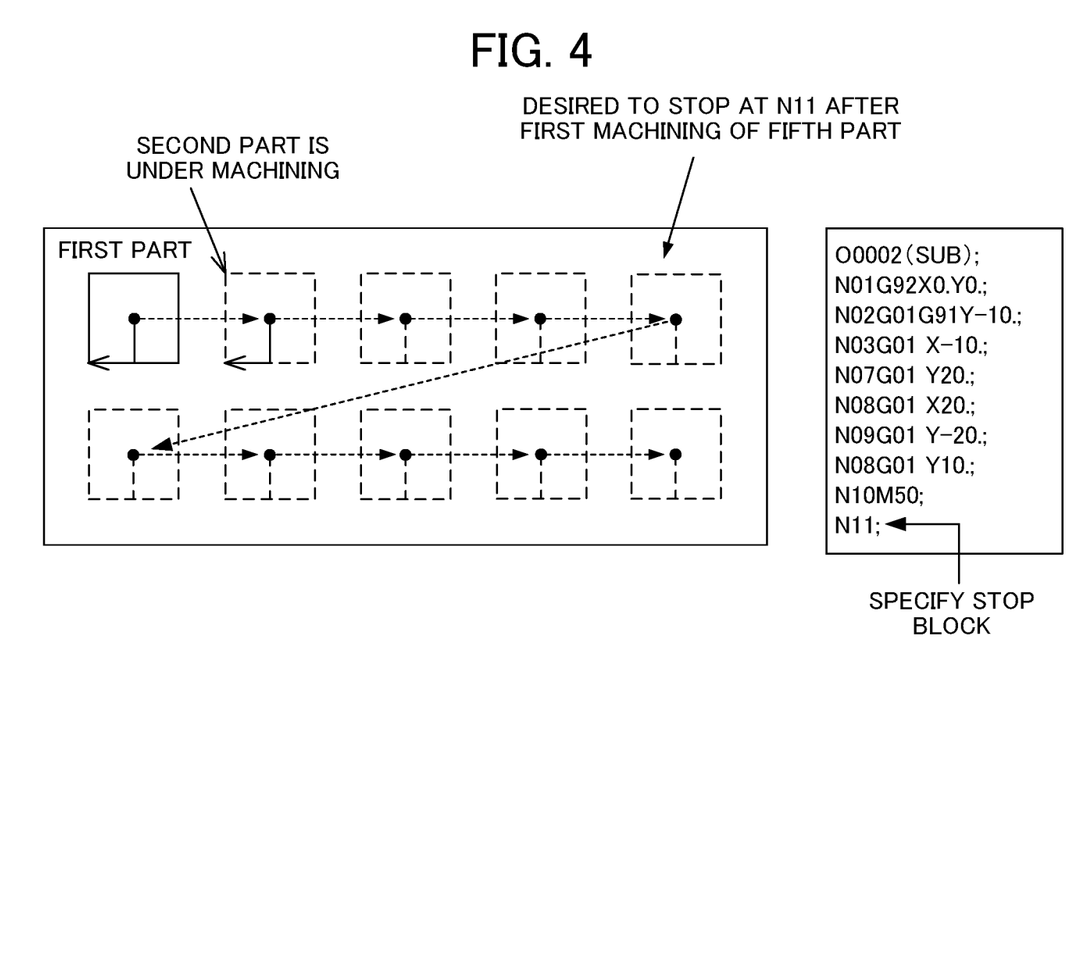
FIG. 4 is a diagram showing an example of a display screen and a machining program at the time of multi-piece machining in the numerical control device of an embodiment.

Hereinafter, a third embodiment of the present invention will be described with reference to FIG. 4. FIG. 4 shows an example of a display screen and a machining program at the time of multi-piece machining in a numerical control device 1B according to the third embodiment.

In a case in which a specific N number appears by the specified number of times in the machining program, the numerical control device 1B according to the third embodiment sets the program stop condition corresponding to the machining stop condition to finish machining at the position of the N number. For example, in a case in which the specified number of times is twice, and the specified N number is N11, if the block of N11 is executed for the first time in the machining program, the execution of the program is not stopped, and the execution of the program is stopped if N11 appears at the second time.

3.1 Machining Stop Condition

Referring to FIG. 4, with respect to the machining stop condition set by the user, for example, the machining stop condition to stop the execution of the program at the block of N11 at the time of first machining the 5th part during machining the second part, the program stop condition setting section 121 calculates the remaining number of times of the block of N11 and sets the number of times of the N-number block as a stop condition so as to stop at the block of N11 subsequent to the block of N11 at the time of the final machining of the fourth part.

3.2 Effect of Third Embodiment

As described above, in a case in which the machining stop condition is the condition to stop machining at the N number block of the specified number of times in continuous machining, the program stop condition setting section 121 sets the stop condition so as to stop at the N number block of the specified number of times from the program head in order to stop at the N number block of the specified number of times.

With such a configuration, the Y-th processing (e.g., the first finishing processing) of the X-th part can be specified and stopped. Conventionally, in order to stop machining with the specified N number block after the Y-th machining of the X-th part, it is necessary to set the sequence number comparison stop function after the execution of the specified (Y−1)-th N number block of the X-th part. However, in the present embodiment, it is possible to set the program stop condition before machining.

4. Fourth Embodiment

Hereinafter, a fourth embodiment of the present invention will be described.

In a case in which a specific N number appears for the specified number of times in the machining program, a numerical control device 1C according to the fourth embodiment skips the N number, and sets the program stop condition corresponding to the machining stop condition to stop machining at the location of the next N number.

4.1 Machining Stop Condition

Referring to FIG. 4, with respect to the machining stop condition set by the user, for example, the machining stop condition to skip the block of N11 at the time of first machining the fifth part during machining the second part, and stop the execution of the program at the block of N11 at the next time, the program stop condition setting section 121 calculates the number of blocks from the program head and sets the program stop condition including the number of the blocks so as to stop at the block of N11 at the next time of the block of N11 at the time of first machining the fifth part. It may be configured not to calculate the number of blocks from the program head, and have variables for counting the number of times of the block of N11 to a numerical control device to compare conditions as to whether to stop machining.

4.2 Effect of Fourth Embodiment

As described above, in a case in which the machining stop condition is the condition to skip the block of the N number of the specified number of times in continuous machining and finish machining at the block of the N number at the next time, the program stop condition setting section 121 skips the block of the N number of the specified number of times, and sets the program stop condition including the number of blocks from the program head for stopping at the block of the N number at the next time.

With such a configuration, the processing at the next time of the Y-th processing (e.g., the first finishing processing) of the X-th part can be specified and stopped. Conventionally, in order to stop machining with the specified N number block after the Y+1-th machining of the X-th part, it is necessary to set the sequence number comparison stop function after the execution of the specified (Y)-th N number block of the X-th part. However, in the present embodiment, it is possible to set the program stop condition before machining.

It should be noted that, in the first to fourth embodiments, the setting of the program stop condition is not limited to the case in which call of a sub program or the like exists. For example, it is also applicable to a case in which there is no sub program and only the main program exists.

Although the embodiments of the present invention have been described above, the present invention is not limited to the embodiments described above. Furthermore, the effects described in the present embodiment are only the most preferable effects produced from the present invention, and the effects according to the present invention are not limited to those described in the present embodiment.

EXPLANATION OF REFERENCE NUMERALS

1, 1A, 1B, 1C numerical control device
11 command program analysis unit
12 program stop unit
13 analyzed program execution unit
14 check drawing display unit
111 program analysis section
112 call determining section
113 call executing section
121 program stop condition setting section
122 program stop determining section
123 program stop requesting section

What is claimed is:

1. A numerical control device that operates in accordance with a command program, comprising:
    a program analysis section that, upon executing a command program for continuously machining a plurality of parts, analyzes the command program;
    an analyzed program execution unit that executes the command program analyzed by the program analysis section;
    a program stop condition setting section that sets a program stop condition in the command program on a basis of a machining stop condition for stopping the continuous machining specified by a user;
    a program stop determining section that determines whether an execution block of the command program satisfies the program stop condition on a basis of an analysis result of the command program by the program analysis section; and
    a program stop requesting section that, in a case in which the program stop determining section determines that the execution block of the command program satisfies the program stop condition, outputs an execution block stop request of the command program to the analyzed program execution unit,
    wherein upon acquiring the execution block stop request from the program stop requesting section, the analyzed program execution unit stops execution of the command program in an execution block of the command program that has been requested.

2. The numerical control device according to claim 1, wherein, in a case in which the machining stop condition is a condition to stop machining at a position where machining is completed at a part immediately before a remaining amount of a consumable used for the continuous machining runs out, the program stop condition setting section sets a program stop condition including a number of blocks from a program head of the command program corresponding to the machining stop condition to a stop block.

3. The numerical control device according to claim 1, wherein, in a case in which the machining stop condition is a condition to stop machining at a specified position of a machining shape of an unmachined portion of a check drawing path, the program stop condition setting section sets a program stop condition including a number of blocks from a program head of the command program corresponding to the machining stop condition to a stop block when machining of a predetermined machining shape is finished.

4. The numerical control device according to claim 1, wherein, in a case in which the machining stop condition is a condition to stop machining at an N number block of a specified number of times in the continuous machining, the program stop condition setting section sets a stop condition for stopping at the N number block of the specified number of times.

5. The numerical control device according to claim 1, wherein, if the machining stop condition is a condition to skip an N number block of a specified number of times in the continuous machining and finish machining at an N number block at a next time, the program stop condition setting section sets a stop condition for skipping the N number block of the specified number of times and stopping at the N number block at the next time.

* * * * *